Dec. 18, 1956  R. L. GARMAN ET AL  2,774,149
RADAR TRAINER
Filed Feb. 19, 1946  4 Sheets-Sheet 4

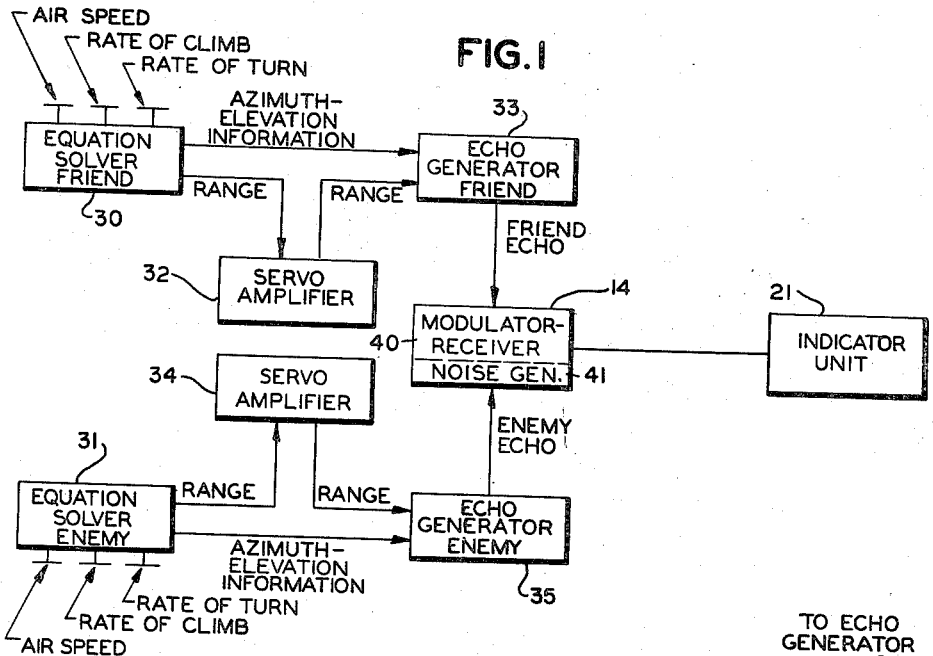

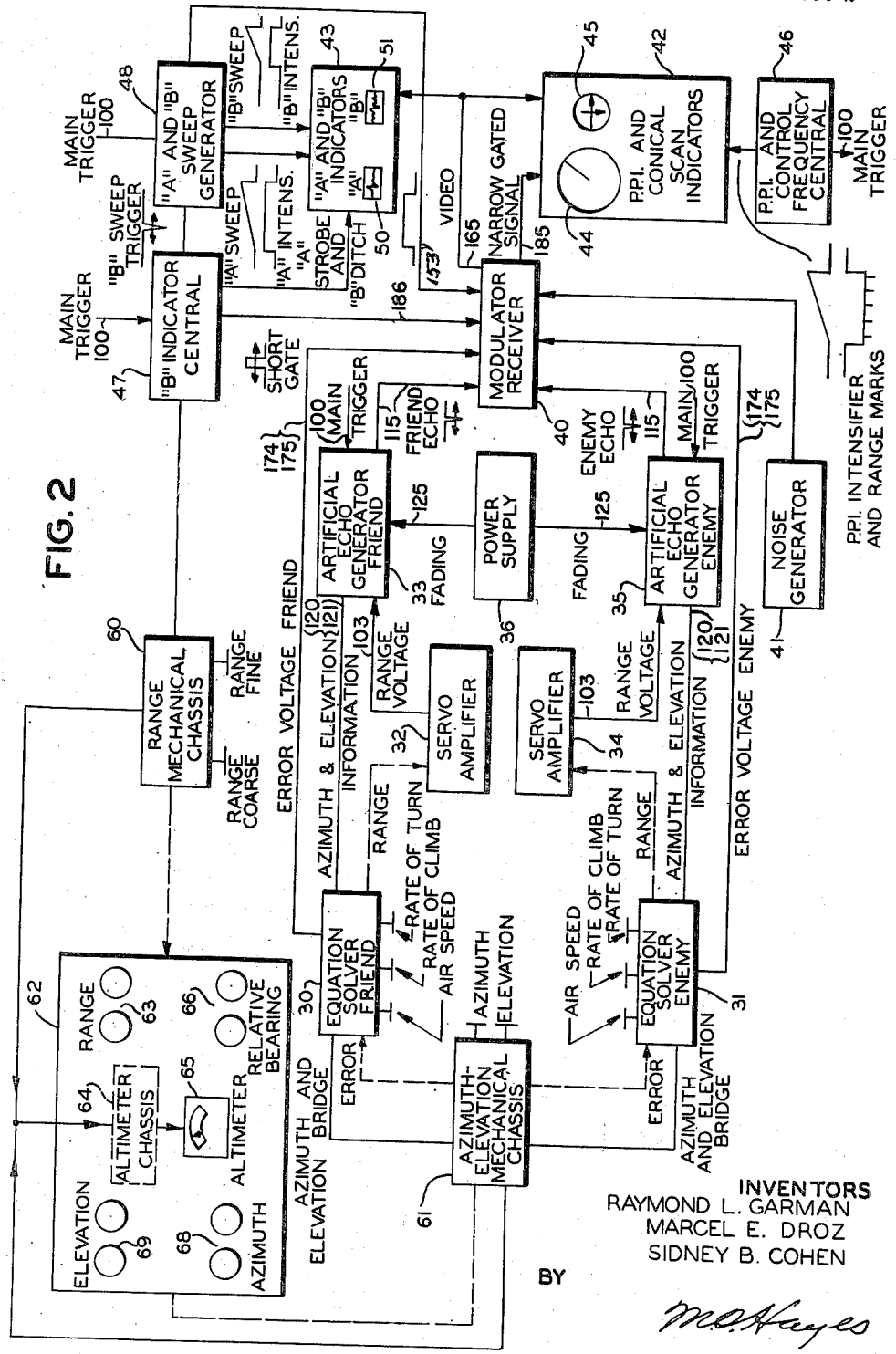

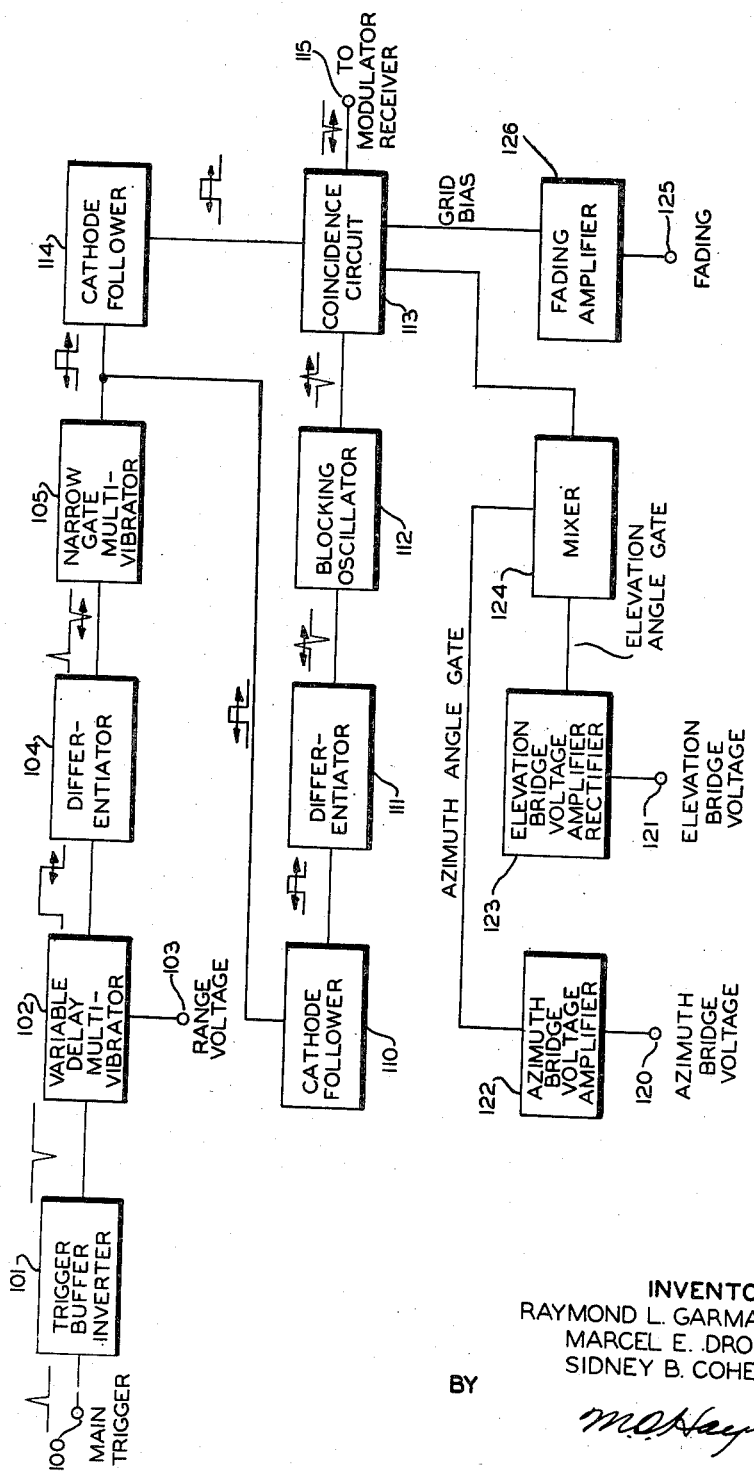

INVENTORS
RAYMOND L. GARMAN
MARCEL E. DROZ
SIDNEY B. COHEN
BY
M. O. Hayes
ATTORNEY

United States Patent Office 2,774,149
Patented Dec. 18, 1956

2,774,149
RADAR TRAINER

Raymond L. Garman, Flushing, N. Y., and Marcel E. Droz and Sidney B. Cohen, Cambridge, Mass., assignors, by mesne assignments, to the United States of America as represented by the Secretary of the Navy Application February 19, 1946, Serial No. 648,793

8 Claims. (Cl. 35—10.4)

This invention relates to electrical apparatus for training the operators of radar systems, and more particularly to apparatus for training personnel to direct the flight of aircraft by radar means.

The use of radar systems offers a convenient and practical method of directing the flight of aircraft under conditions of limited visibility, or when for any reason successful navigation by the pilot would be difficult. In this method information as to the position of the aircraft is obtained from the radar. (By the word radar as used alone in this specification is meant a complete radar system.) The position information so obtained can be referred to a map and instructions as to proper course can be given the pilot over his regular radio communications system. It will be apparent that such methods may be used to guide a plane, for example, to an airfield, to a ship, or to intercept another plane. The successful operation of such an aircraft guidance system requires that the radar operators and the directing personnel be highly trained. This training can be most advantageously provided by a training system which will simulate all of the effects of aircraft in flight on a radar system.

Accordingly, it is a principal object of this invention to provide an apparatus for training radar operators.

It is also an object of this invention to provide a radar training apparatus which will simulate the effects of aircraft in flight on a radar system.

It is further an object of this invention to provide a radar training apparatus in which the simulations of aircraft are under the continuous control of the instructors.

The above and further objects of this invention will be made apparent by the following detailed description and the appended drawings of which:

Fig. 1 is a simplified block diagram of one embodiment of the invention to be used for training personnel to direct fighter aircraft to intercept enemy planes;

Fig. 2 is a more complete block diagram of the system of Fig. 1;

Fig. 3 is a block diagram of the range information servo system;

Fig. 4 is a schematic diagram of an azimuth-elevation information bridge;

Fig. 5 is a block diagram of the artificial echo generators;

Figure 6:
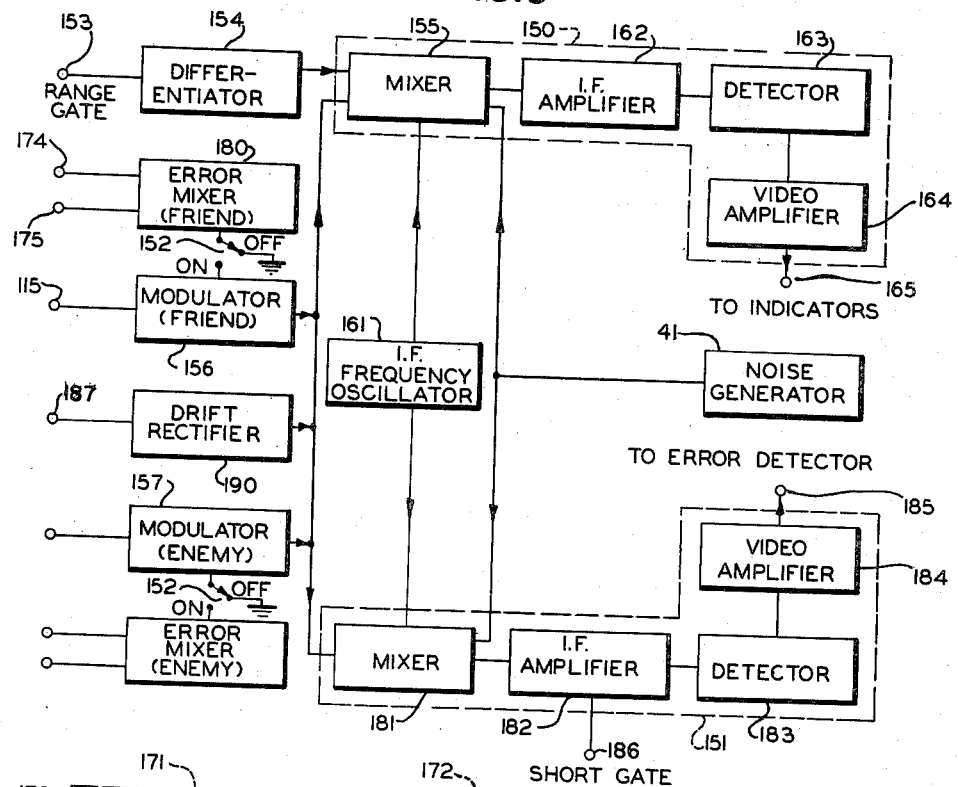
Fig. 6 is a block diagram of the modulator-receiver.

The principal functions to be performed by this embodiment of the invention are shown by Fig. 1. The friendly pilot operates the controls of equation solver 30 controlling the air speed, rate of climb, and rate of turn. Equation solver 30 equates these factors into range, azimuth and elevation information by electrical and mechanical means, and the range information output of 30 is fed to servo amplifier 32 which provides sufficient torque to operate a range potentiometer as illustrated in Fig. 3. The azimuth and elevation outputs from equation solver 30 and the amplified range output from servo amplifier 32 are fed to echo generator 33 which produces an echo simulating the radar echo which would be obtained by a radar from a plane at the position determined by the outputs from equation solver 30. This "friend" echo output from echo generator 33 is applied to one input of modulator-receiver 40. In a similar fashion the "enemy pilot" operates the controls of equation solver 31 controlling the airspeed, rate of climb, and rate of turn of the simulation of an "enemy plane." The azimuth and elevation outputs from equation solver 31 are fed directly to echo generator 35, similar to echo generator 33, and the range output of equation solver 31 is fed to echo generator 35 through servo amplifier 34 of the type shown in Fig. 3 which applifies the range information. Echo generator 35 produces an "enemy" echo representing the enemy aircraft in the trainer problem, and this "enemy" echo is applied to a second input of modulator receiver 40. The two echoes are modulated by modulator-receiver 40 to simulate the effects of noise and fading and these modulated echo signals are applied to indicator unit 21. The operators of the trainer can obtain each echo separately displayed on the indicators of unit 21 and so determine the apparent position of the aircraft simulated by the respective echoes. This information may be relayed by the trainer operators to personnel charged with plotting this information on suitable charts and directing the friendly "pilot" as to course and speed necessary to intercept the "enemy" plane. In this fashion the radar trainer permits the operators and directors to carry out complete interception problems without use of actual aircraft, thus developing the skill necessary for aircraft direction.

A more complete understanding of the invention may be had by reference to Fig. 2 in which the solid lines represent electrical connections and the broken single lines represent synchro connections. Two equation solvers 30 and 31 which provide the azimuth, elevation and range information for the "friend" and "enemy" planes respectively, are controlled by operators or "pilots" who operate the three controls of each equation solver controlling the air speed, rate of climb, and rate of turn of the simulation of the planes. These equation solvers are of the type disclosed in the copending application of Marcel E. Droz, Serial No. 692,021, filed August 21, 1946, for Mechanical Equation Solver. With the exception of equation solvers 30 and 31 the embodiment of Fig. 2 is contained in a "mock-up" of the indicator console of the radar for which the trainer is designed. This provides the operators with the same controls, indicator displays and data panels as would be found on the radar. As in the simplified system of Fig. 1, the azimuth and elevation information of each equation solver is fed directly to an echo generator, the range information first being amplified by a servo amplifier. In Fig. 2 the outputs from equation solver 30 are fed to servo amplifier 32 and echo generator 33, and the outputs from equation solver 31 are fed to servo amplifier 34 and echo generator 35. Echo generators 33 and 35 generate artificial echoes having the characteristics of radar echoes from planes in positions as determined by the outputs of equation solvers 30 and 31. An unregulated bias voltage is supplied to echo generators 33 and 35 by power supply 36, the random variations in this bias voltage causing random variation in the amplitude of the echo signals and thus simulating the effects of fading in radar echoes. This output from power supply 36 and the corresponding inputs 125 to echo generators 33 and 35 are labeled on Fig. 2 as "Fading." The regulated voltage outputs from supply 36 to the other circuits of the trainer are not shown on Fig. 2. The "friend" and "enemy" echoes so generated are fed to modulator receiver 40, in which circuit the echo signals are mixed with the noise output of noise generator 41, and are attenuated proportional to range by a means to be hereinafter described. The modulated echo output from modulator-receiver 40 is fed to two indicator units 42 and 43 which provide the same cathode ray tube displays as the radar for which the trainer is designed. In this embodiment indicator unit 42 provides a Plan Position Indicator, or P. P. I. 44, and a conical scan, or cross-meter, unit 45. P. P. I. and control frequency central 46 provides the necessary sweep and intensifier voltages for P. P. I. tube 44, and also a main trigger for the other circuits of the trainer including echo generators 33 and 35, "B" indicator central 47 and "A" and "B" sweep generator 48. Indicator unit 43 provides two cathode ray tube displays, the "A" tube 50 having a horizontal sweep of time duration equal to 80 nautical miles of radar range, that is, approximately 1000 micro-seconds. The "B" tube 51 has a sweep of approximately 4 miles in duration and may be triggered at any two mile interval along the "A" sweep. The modulated echo signal output from modulator receiver 40 is applied to the cathode of P. P. I. cathode ray tube 44 and intensity modulates that tube. The same signal output is applied to the vertical deflection plates of "A" tube 50 and "B" tube 51, deflection modulating these displays. P. P. I. tube 44 may be supplied with any one of three ranges, 10, 50, and 80 nautical miles respectively. Thus the trainer operators have a choice of three displays: the signals may be viewed on P. P. I. tube 44, provided they fall within the range chosen by the operators, or all signals within 80 miles range will be visible as vertical deflections of the sweep on the "A" tube 50, and finally the operators may have an expanded view of any 4 mile section of the "A" display by means of "B" tube 51. "B" indicator central 47 is triggered by the main trigger from control frequency central 46 and produces three outputs. The first output is a "B" sweep trigger to "A" and "B" sweep generator 48 delayed by a time with respect to the main trigger, the amount of the delay being variable in increments of two miles by the operator. The second output is a narrow square voltage wave of approximately 5 microseconds duration which is supplied to both the "A" and "B" indicators. This square wave is delayed with respect to the main trigger, the amount of the delay being continuously variable by the operator. Applied to the "B" indicator it causes a downward deflection of the trace and is known as the "ditch." Accurate ranging on echoes is accomplished by adjusting the delay of this "ditch" so that the chosen echo signal appears in the "ditch" on the "B" indicator. The same voltage is applied to the "A" indicator and appears as a narrow upward deflection of the trace here being called the "strobe." Course ranging can be accomplished by adjusting the position of the "strobe," so that it overlies the echo signal on the "A" trace. The third output of "B" indicator central 47 is this same narrow voltage pulse applied as an enabling gate to the conical scan error channel of modulator-receiver 40. As above mentioned, "A" and "B" sweep generator 48 is supplied with two input triggers, the main trigger from unit 46 and the "B" trigger from "B" indicator central 47. The main trigger operates the "A" sweep generator which provides the 80 mile sweep and intensification voltages to cathode ray tube 50 of indicator unit 43. The "B" trigger operates the "B" sweep generator which provides the 4 mile sweep and intensification voltages to "B" cathode ray tube 51. The "A" sweep generator also supplies a range gate, or enabling voltage, of the same duration as the "A" sweep voltage, to modulation receiver unit 40.

In addition to the above described echo simulation sources and indicator units it is necessary to provide a control system and a data panel of the same type as would be found on the radar. In the embodiment of Fig. 2 the control system is simulated by range mechanical chassis 60 and azimuth-elevation mechanical chassis 61, and the data panel is provided by unit 62. Range-mechanical chassis 60 has coarse and fine range controls which are controlled by the operator. A first output of chassis 60 is a mechanical output to data panel 62 operating range dials 63, and showing at all times the range setting of the leading edge of the "B" ditch. The operator can determine the range of a target by adjusting the controls of range chassis 60 until the echo "blip" of the target is set in the "ditch" on the "B" display, and the range of the target is then read from range dials 63. A second output from range chassis 60 is a voltage to "B" indicator central 47 which is used to control the delay of the "B" trigger with respect to the main trigger and permit the adjustment of the "B" sweep and "ditch" for ranging. A third output from range chassis 60 is combined with an elevation output from azimuth-elevation chassis 61 and fed to altimeter chassis 64, which analyzes the mathematical relationship between these outputs to determine the altitude of the chosen target. This altitude information is displayed on altimeter 65 of data panel 62.

Azimuth-elevation mechanical chassis 61 also has two operator controls simulating the control of the antenna of the radar system, these controls being the azimuth and elevation controls respectively. In the radar the antenna can be rotated throughout 360° and the axis of the antenna may be elevated to maximize the signal from a target for purposes of bearing and altitude determination. This effect must be simulated in the radar trainer.

Outputs of azimuth-mechanical chassis 61 to data panel 62 are: a mechanical output to coarse and fine relative bearing dials 66, a mechanical output to azimuth dial 68, a mechanical output to elevation dial 69, and the above-mentioned electrical output to altimeter chassis 64. The above-described dials indicate settings in bearing and elevation in simulation of the antenna.

It will be apparent that in a radar system the echo from a plane will not appear on the indicators unless the antenna is pointed in the direction of the plane. This effect must be simulated by the trainer, and to provide this simulation electrical connections are made between azimuth-elevation mechanical chassis 61 and equation solvers 30 and 31. These connections constitute azimuth and elevation bridges, one of which is illustrated in Fig. 4 the output voltages from these bridges providing the azimuth-elevation information which is fed to echo generators 33 and 35, and block the echo generators unless the bearing and elevation in simulation of the antenna, as determined by mechanical chassis 61, agree within certain limits with the bearing and elevation of the chosen target as determined by equation solver 30 or 31. The manner in which this is accomplished will be more fully explained with reference to Figs. 3 and 4.

The radar which the embodiment of Fig. 2 is intended to simulate may be operated with or without conical scanning of the radar beam. To simulate operation without conical scanning, switches 152 of Fig. 6 are turned to the "off" position and the "pilots" adjust the controls of equation solvers 30 and 31 to simulate the desired courses of the "friendly" and "enemy" planes. The "radar operators," or trainees, adjust the azimuth and elevation controls of mechanical chassis 61 until one of the echoes, say the friend echo, appears on the "A" indicator cathode ray tube. The range operator then adjusts the range controls of mechanical chassis 60 until the desired echo appears in the "ditch" on the "B" tube. The range of the "friend" plane can then be read from range dials 63. Rough measurements of the bearing and elevation of the plane may be made by adjusting the azimuth and elevation controls of mechanical chassis 61 to maximize the amplitude of the echo as seen on "B" indicator 51, and reading the bearing and elevation dials 66 and 69 respectively. The above described process is repeated to obtain the same information with regard to the "enemy" plane. These operations are exactly those that would be performed by the operators of the radar system.

Figure 7:
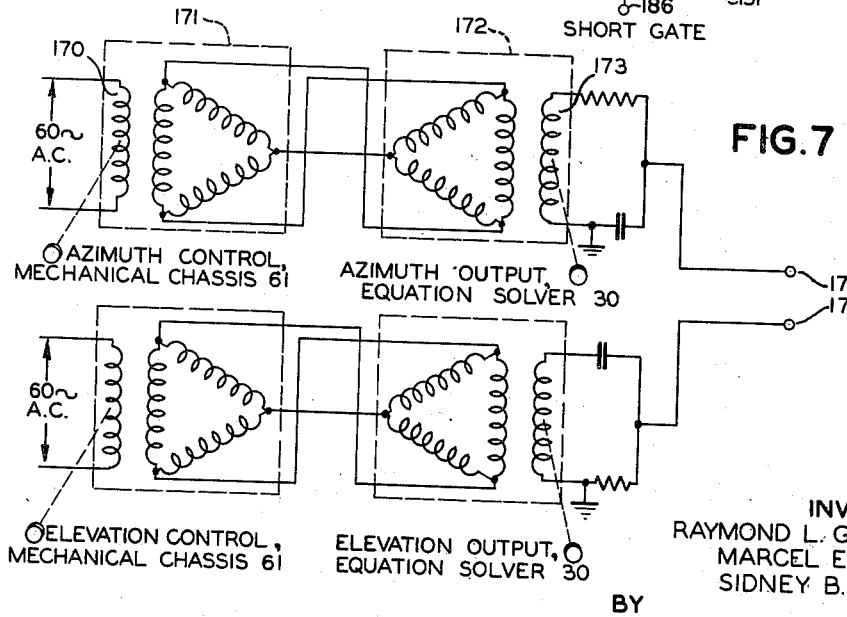
Fig. 7 is a schematic diagram of the selsyn system used to produce the error voltage for simulating conical scanning.

It was noted in the preceding paragraph that the bearing and elevation measurements made were rough, as they would be by a radar system without some switching or scanning of the radar beam. In the radar system more accurate bearing information is obtained by conical scanning, that is causing the axis of the radar beam to trace out a cone in space. To simulate such conical scanning in the trainer, switches 152 of Fig. 6 are turned to the "on" position, mechanical connections are made between azimuth-elevation chassis 61 and equation solvers 30 and 31, as illustrated in Fig. 7, resulting in azimuth and elevation error voltage outputs as 174 and 175, respectively, from each of equation solvers 30 and 31 to modulator-receiver 40. These error voltages are used to modulate the respective "friend" and "enemy" echo signals, and the chosen modulated echo is amplified by the narrow gated channel in modulator-receiver 40. This narrow gated signal is applied to indicator unit 42 where the modulation is detected and used to activate cross-meter 45. The manner in which this is accomplished is more fully explained hereinafter. When the elevation and azimuth error voltages are equal the two indicating needles of the meter of cross-meter unit 45 will be perpendicularly crossed indicating that the readings of dials 68 and 69 are correct.

To facilitate understanding of the invention a more detailed explanation of certain components used in this embodiment will be made with reference to Figs. 3, 4, 5, 6 and 7. Fig. 3 is a functional diagram of the range information servo amplifiers 32 and 34. The range output shaft of equation solver 30 or 31 (Fig. 2) controls the position of rotor 80 of synchro generator 81. The stator windings of synchro 81 are coupled in the usual fashion to the stator windings of synchro control transformer 82. The error voltage generated in rotor winding 83 is amplified by amplifiers 84 and 85 and used to operate motor 86. Motor 86 drives rotor 83 until the error voltage returns to zero, and also drives movable contactor 87 of range potentiometer 88. The voltage on contactor 87 is fed to echo generator 33 or 35 as the needed range information. Fig. 4 is a circuit diagram of one of the four azimuth and elevation bridges which supply azimuth and elevation information to the echo generators. In Fig. 4 an oscillator (not shown) supplies an alternating potential of 400 to 1000 cycles per second frequency to the primary of transformer 70. Potentiometer 71 is connected across the secondary of transformer 70 and sliding contact 72 is grounded. The position of sliding contact 72 is adjusted by the elevation control on azimuth-mechanical chassis 61. A similar potentiometer 73 is connected in parallel with potentiometer 71 and sliding contact 74 of potentiometer 73 is operated by the elevation shaft of equation solver 30. It will be apparent that the magnitude of the voltage at sliding contact 74 will depend upon the relative settings of contacts 72 and 74. The output voltage at sliding contact 74 is connected through cathode follower 75 to echo generator 33 to control the echo output. Four bridges of the type shown in Fig. 4 will be needed in this embodiment, one for each of the azimuth and elevation channels of each of the two equation solvers 30 and 31. Since these bridges will be exactly similar only the one is described.

Echo generator 33 is shown in detailed block diagram form in Fig. 5. The functions of this echo generator 33 are to generate an artificial echo signal delayed with respect to the main trigger of the trainer system by a time proportional to the range of the aircraft being simulated, to supply this artificial echo signal to the modulator receiver (Fig. 2) when the setting of the operators' azimuth and elevation dials agree within certain limits with the azimuth and elevation of the plane being simulated, and to provide a random amplitude modulation of this echo signal to simulate fading. Echo generator 35 is identical with echo generator 33 and hence will not be described. The main trigger voltage from control frequency central 46 (Fig. 2) is applied at terminal 100 and fed through buffer-inverter stage 101 to trigger variable delay multivibrator 102. The delay of multivibrator 102 is controlled by the range voltage output of servo amplifier 32 (Fig. 2) applied at terminal 103, causing the time duration of the positive going square wave output of multivibrator 102 to be proportional to the range of the plane being simulated as determined by equation solver 30 (Fig. 2). The square wave output of multivibrator 102 is differentiated by circuit 104, resulting in a positive going trigger voltage in time coincidence with the main trigger at terminal 100 and a negative going trigger voltage delayed in time with respect to the main trigger by an amount proportional to the range voltage at terminal 103. The variable time negative trigger voltage triggers narrow gate multivibrator 105, resulting in a positive going square wave of approximately 50 microseconds duration occurring in time coincidence with the negative trigger from circuit 104. This positive square wave is fed in a first channel through cathode follower 110 to differentiator circuit 111, the output of which is a positive going trigger voltage and a negative going trigger voltage occurring in coincidence with the leading and trailing edges, respectively, of the gate voltage output of multivibrator 105. The positive going trigger from circuit 111 triggers blocking oscillator 112, providing a single cycle output to coincidence circuit 113 for each positive trigger from differentiator circuit 111. The output of multivibrator 105 is fed in a second channel through cathode follower 114 to a second input of coincidence circuit 113. The enabling gate voltage thus applied to this second input of coincidence circuit 113 will always occur simultaneously with the output from oscillator 112 since blocking oscillator 112 is triggered by the leading edge of the enabling gate voltage. Thus the artificial echo signal developed by blocking oscillator 112 will be passed by coincidence circuit 113 to output terminal 115 provided the bias conditions, as hereinafter explained, on the control grid and cathode respectively of the tube of coincidence circuit 113 are such that the tube can conduct. The outputs of the azimuth and elevation bridges (Fig. 4) are connected to terminals 120 and 121 respectively and thence to separate amplifier-rectifiers 122 and 123. The rectified azimuth and elevation voltage outputs of amplifier-rectifiers 122 and 123 are combined by mixer stage 124 and applied as a bias voltage to the cathode of the tube of coincidence circuit 113. If the settings of the control dials of Fig. 4 do not differ by more than 2°, the azimuth and elevation voltages will be sufficiently small so that the cathode bias applied to the coincidence tube by mixer stage 124 will not keep the tube cut off and will permit the passage of the artificial echo signal to output terminal 115. It will be apparent that the gain of the coincidence tube will be varied by the cathode bias and thus the amplitude of the signal output will depend upon the difference between the settings of the control dials of Fig. 4. Hence the magnitude of the signal will be a maximum when the control dials are in exact agreement with the outputs of equation solver 30. As previously described, an unregulated voltage is obtained from the "fading" output of power supply 36 (Fig. 2) and applied to terminal 125 of Fig. 5. This fading voltage is amplified by fading amplifier 126 and applied as a bias on the control grid of the tube of coincidence circuit 113. The amplitude of the artificial echo signal at output terminal 115 will then have a random fluctuation, due to the fluctuating grid bias thus applied, and will closely resemble the varying radar echo obtained from a plane.

Modulator-receiver 40 (Fig. 2) accepts the artificial echoes generated by echo generators 33 and 35, and after further modulation passes these echo signals to indicator units 50 and 51. The modulation accomplished by modulator-receiver 40 simulates the attenuation of the radar signals with increasing range of the target, the addition of noise to the signal, and the modulation of the signal which is characteristic of conical scanning of the radar beam. Further explanation of the manner in which these modulations are accomplished will be made with reference to Figs. 6 and 7. The block diagram of Fig. 6 shows two signal channels in the modulator-receiver. Upper channel 150 comprises the video signal channel and lower channel 151 comprises the error detector channel for the conical scan system. Video channel 150 will be discussed first assuming that the conical scan switches 152 are in the "off" position. The long range enabling gate from sweep generator unit 48 (Fig. 2) is applied at terminal 153. This gate voltage is used to enable the modulator-receiver for a period of time equal to the maximum range of the system after the main trigger. This enabling gate voltage is fed through differentiator circuit 154, resulting in an enabling voltage to mixer 155 which decreases with time, thus reducing the gain of the receiver with increasing range to simulate the attenuation of radar echoes with increasing range of the target. The "friend" and "enemy" echoes from artificial echo generators 33 and 35 (Fig. 2) are applied to modulators 156 and 157 respectively. With conical scan switches 152 in the "off" position, modulators 156 and 157 act as echo amplifiers and feed the respective echo signals to mixer 155. Mixer 155 also has inputs from noise generator 41 and intermediate frequency (I. F.) oscillator 161 and combines these inputs with the echo signals from modulators 156 and 157, resulting in an output to I. F. amplifier 162 consisting of the echo signals and noise on an intermediate frequency carrier. This signal is amplified by I. F. amplifier 162, fed to detector 163, and the resultant video signal is amplified by video amplifier 164, the video output of the indicators appearing at terminal 165.

To simulate conical scanning and to operate cross-meter unit 45 (Fig. 2) it is necessary to generate an error signal in each of the equation solvers 30 and 31 (Fig. 2). The method of generating this error signal is shown in Fig. 7. The rotor winding 170 of a selsyn 171 is mechanically coupled to the azimuth control of azimuth-elevation mechanical chassis 61 (Fig. 2). The rotor winding has applied to it a 60 cycle alternating voltage and the stator windings are connected in the usual fashion to the stator windings of a second selsyn 172. The rotor winding 173 of selsyn 172 is mechanically coupled to the azimuth output of equation solver 30 (Fig. 2) and therefore the magnitude of the output voltage obtained from rotor winding 173 will depend upon the error in the settings of rotors 170 and 173. A similar selsyn system is provided for the elevation signal, resulting in two 60 cycle outputs to terminals 174 and 175, these signals differing in phase by 90° and the magnitude of each being determined by the azimuth and elevation errors respectively. These signals are combined in error mixer 180 (Fig. 6) to provide a 60 cycle output, the phase of which will depend upon the relative amplitudes of the two error signal inputs. If conical scan switches 152 are in the "on" position, the output of error mixer 180 is applied to modulator 156 and modulates the "friend" echo signal. This modulation results in the video signal at terminal 165 appearing on the indicator cathode ray tubes with the modulation characteristic of a radar signal when the radar beam is scanning in a conical manner. The output of modulator 156 is also fed to mixer 181 of error signal channel 151. Mixer 181 also has inputs from intermediate oscillator 161 and noise generator 41, the output of mixer 181 being the echo signals and noise on an I. F. carrier, and this signal is fed to I. F. amplifier 182. A short gate voltage from "B" indicator central 47 (Fig. 2) is applied to I. F. amplifier 182 at terminal 186 to enable this amplifier only during the period of the "B" sweep. This results in the output of error signal channel 151 comprising only such signals as are visible in the "ditch" of "B" indicator 51 (Fig. 2), so that conical scan indicator 45 (Fig. 2) will be activated only by the echo signal chosen by the operators. The output of I. F. amplifier 182 is fed to detector 183, and the video signal amplified by amplifier 184. Assuming that the radar trainer is set in range and roughly in elevation and azimuth upon the "friend" echo signal, there will appear at terminal 185 (Fig. 6) this friend echo signal modulated by a 60 cycle error signal and the phase of this modulation will depend upon the relative azimuth and elevation errors. This modulated signal is fed to a phase-sensitive detector in indicator 42 and used to operate cross-meter unit 45 (Fig. 2) to indicate the azimuth and elevaion errors. When the elevation and azimuth controls of azimuth elevation mechanical chassis 61 (Fig. 2) are adjusted so that the two pointers of cross-meter 45 are perpendicularly crossed, the azimuth and elevation of the friend plane may be read from dials 68 and 69 respectively (Fig. 2). The above conical scan system which has been described and shown in Fig. 7 with respect to the "friend" signal system is duplicated for the "enemy" system, simulating a conical scanning radar for both "friend" and "enemy" echoes.

This embodiment also simulates the effect of drifting of the transmitter frequency in a radar system. A bridge similar to Fig. 4 fed by the 400–1000 cycle oscillator of azimuth-elevation mechanical chassis 61 (Fig. 2) is caused to become unbalanced by a motor moving contact 74, for example. This feeds a signal increasing in magnitude with time to terminal 187 of drift rectifier 190 (Fig. 6). The output of drift rectifier 190 supplies the screen grid bias for the tubes of mixers 155 and 181 (Fig. 6) in such a manner that as the drift signal increases the screen grid voltages become increasingly negative and thus decreasing the amplitude of the signals from the modulator-receiver, as would occur in a radar due to drift of the transmitter frequency.

The components of the embodiment of Fig. 2 which have not been described in detail are common to radar systems. The description of one embodiment is for the purpose of illustrating the principles of the invention. Other embodiments will occur to those skilled in the art and no attempt has been made in this specification to exhaust such possibilities. The scope of the invention is defined by the appended claims.

What is claimed is:

1. A system for training radar operators in the location of moving objects comprising an indicator unit having indicator displays, indicator adjustments, power supplies, sweep generators, trigger voltage sources, and data panels as found on a radar system; means to produce outputs giving range, azimuth, and elevation data about the position of an object in response to adjustments adapted to represent the air speed, rate of climb, and rate of turn of said object; apparatus for producing signals derived from said indicator sweep, delayed by a time proportional to said range data, and attenuated in response to said azimuth and elevation data and to indicator adjustments of azimuth and elevation; means to modulate said signal in response to voltage representing the characteristics of high frequency radar scanning, means to apply said modulated signal to said indicator, and means connected to said indicator adjustments to present on said data panels the position parameters indicated for said objects.

2. A system for training radar operators in the location of moving objects comprising an indicator unit having indicator displays, indicator adjustments, sweep generators, trigger voltage sources and data panels as found in radar systems; means producing outputs supplying range, azimuth, and elevation data concerning the positions of said objects in space, said means having adjustable components to modify said outputs by factors adapted to represent air speed, rate of climb, and rate of turn; apparatus for producing signals derived from said trigger voltage source and delayed with respect to said trigger voltage by a time proportional to said range data, means to adjust the amplitude of said signals in response to a potential which is determined by the position of indicator adjustments of azimuth and elevation with respect to said azimuth and elevation outputs, a source of random fluctuating voltage, means for amplitude modulating said signals with said random fluctuating voltage to represent the effect of fading; a generator of noise voltages, means to modulate said signals with said noise voltages, means to attenuate said modulated signals in response to a potential derived from said sweep generator proportional to the range selected for said indicator displays; means to attenuate said modulated signals in response to a voltage variable with time to introduce the characteristic of transmitter frequency drift, means responsive to indicator adjustments and said azimuth and elevation outputs to modulate said signals with the characteristics of radar beam scanning; means applying said modulated signal to said indicator unit, and means connected to said indicator adjustments for presenting on said data panels the position parameters.

3. A system for training radar operators in the location of moving objects comprising an indicator unit having indicator displays, indicator adjustments, sweep generators, trigger voltage sources, and data panels as found in radar systems; means producing outputs supplying range, azimuth, and elevation data concerning the positions of said objects in space, said means having adjustable components to modify said outputs by factors adapted to represent air speed, rate of climb, and rate of turn; apparatus for producing signals derived from said trigger voltage source and delayed with respect to said trigger voltage by a time proportional to said range data, means to adjust the amplitude of said signals in response to a potential which is determined by the position of indicator adjustments of azimuth and elevation with respect to said azimuth and elevation outputs, a source of random fluctuating voltage, means for modulating said signals with said voltage to represent the effect of fading; a generator of noise voltages, means to modulate said signals with said noise voltages, means to attenuate said modulated signals in response to a potential derived from said sweep generator proportional to the range selected for said indicator displays, means to attenuate said modulated signals in response to a voltage variable with time to introduce the characteristic of transmitter frequency drift, means responsive to indicator adjustments and said azimuth and elevation outputs to modulate said signals with the characteristics of radar beam scanning, means applying said modulated and attenuated signal to said indicator unit, means connected to said indicator adjustments for said indicator's displays to measure range, bearing and elevation from said displays of said signal, means to combine said range and elevation measurements to present altitude indications, and a plurality of indicating dials for presenting on said data panels the position parameters of said objects.

4. In a system for training radar operators in the location of moving objects having an indicator unit including cathode ray tube displays, indicator adjustments for range, azimuth and elevation observation, power supplies, sweep generators, trigger voltage sources and data panels as found in radar systems, the combination of a plurality of computers, each adapted to produce mechanical shaft outputs giving range, azimuth and elevation data about the position of an object in response to adjustments representing the air speed, rate of climb and rate of turn of said object, a plurality of signal generators, one for each of said computers and responsive to a trigger voltage pulse from said indicator for generating a pulse signal delayed with respect to said trigger voltage pulse by a time proportional to its computer's range adjustment, and means for attenuating the amplitude of signal pulse of each of said signal generators in response to the difference between said azimuth and elevation shaft position of its computer and said indicator adjustments of azimuth and elevation observation.

5. Apparatus as in claim 4 including means for combining the signal outputs of said plurality of signal generators into a single signal channel, and means for attenuating the output of said combining means with time in proportion to the range of said indicator display.

6. Apparatus as in claim 4 including a source of random voltage fluctuations, a noise generator and means to modulate said pulse generator with the output of said noise generator and means to attenuate said modulated signals in response to fluctuating voltage to represent the effect of fading.

7. In a system for training radar operators in the location of moving objects having an indicating unit including cathode ray tube indicator displays, indicator adjustments for range, azimuth and elevation observation, power supplies, sweep generators, trigger voltage sources, and data panels as found in radar systems, the combination of, a plurality of position computers yielding mechanical shaft outputs proportional to range, azimuth and elevation data concerning the positions in space of a plurality of moving objects in response to individual adjustments at each computer adapted to represent the air speed, rate of climb and rate of turn of an object following an assumed course, a plurality of energized alternating current bridges, each responsive to an azimuth or elevation output of a selected one of said computers and corresponding indicator azimuth or elevation adjustment to produce an unbalance voltage inversely proportional to the relative agreement between said selected computer output and said indicator adjustment, a pulse signal generator for each of said computers energized by trigger voltage pulse from said indicator to generate a signal pulse delayed with respect to said trigger pulse by a time proportional to its associated computer range adjustment, means to apply the unbalance voltage from the azimuth and elevation bridges associated with its computer to attenuate the amplitude of said signal pulse in proportion to the amplitude of said unbalance voltage, means for combining the signal pulse outputs of said plurality of signal generators into a single signal channel, a self-synchronous position error detector for each of said computers to derive an error voltage proportional to the difference between the azimuth and elevation output shaft settings of said computer and said indicator azimuth and elevation adjustments, means for modulating the output signal of said combining means with the output of a position error detector at a time selected in accordance with the indicator range adjustment required to display the signal from its associated computer, whereby the output signal is given the characteristics of a radar beam conical scan, and means to apply said modulating signal to said indicator whereby said indicator adjustments present from said data panels the position parameters of said moving objects.

8. Apparatus as in claim 7 including a source of random voltage fluctuations, a noise generator and means to modulate the output signal of each of said pulse generators with the output of said noise generator and means to attenuate said modulated signals in response to said fluctuating voltage to represent the effect of fading.

References Cited in the file of this patent

UNITED STATES PATENTS

| | | |
|---|---|---|
| 2,396,112 | Morgan | Mar. 5, 1946 |
| 2,396,857 | Kittredge | Mar. 19, 1946 |
| 2,399,017 | Goldman | Apr. 23, 1946 |
| 2,399,661 | Bowie | May 7, 1946 |
| 2,405,239 | Seeley | Aug. 6, 1946 |
| 2,405,591 | Mason | Aug. 13, 1946 |
| 2,438,888 | Andrews | Apr. 6, 1948 |
| 2,439,169 | Kittredge | Apr. 6, 1948 |
| 2,492,356 | Cesareo | Dec. 27, 1949 |
| 2,693,647 | Bolster | Nov. 9, 1954 |